United States Patent [19]
Isa et al.

[11] 3,906,016
[45] Sept. 16, 1975

[54] METHOD OF PREPARING ESTERS OF CARBOXYLIC ACIDS

[75] Inventors: Hiroshi Isa, Funabashi; Takeo Inagaki, Yachiyo; Yasuhiro Kiyonaga, Narashino; Masuzo Nagayama, Tokyo, all of Japan

[73] Assignee: Lion Fat & Oil Co., Ltd., Tokyo, Japan

[22] Filed: Dec. 22, 1972

[21] Appl. No.: 317,389

[30] Foreign Application Priority Data
Dec. 28, 1971 Japan................................. 47-2766
Dec. 28, 1971 Japan................................. 47-2768

[52] U.S. Cl.... 260/410.9 R; 260/468 M; 260/497 R
[51] Int. Cl.²......................................... C07C 67/38
[58] Field of Search .... 260/410.9 R, 468 M, 497 C, 260/76–79

[56] References Cited
UNITED STATES PATENTS
2,771,478  11/1956  Reppe................................. 260/406
3,660,439  5/1972  Schell........................... 260/410.9 R
3,661,957  5/1972  Shubkin............................. 260/413

FOREIGN PATENTS OR APPLICATIONS
850,675  9/1970  Canada

Primary Examiner—Donald G. Daus
Assistant Examiner—Diana G. Rivers
Attorney, Agent, or Firm—Woodhams, Blanchard and Flynn

[57] ABSTRACT

A method of preparing esters of carboxylic acids by reacting olefins, alcohols and carbon monoxide with one another in the presence of a cobalt catalyst, which comprises the step of adding 0.1 to 2.0 moles of water per 1 mole of the material olefins at the start of the reaction.

6 Claims, 1 Drawing Figure

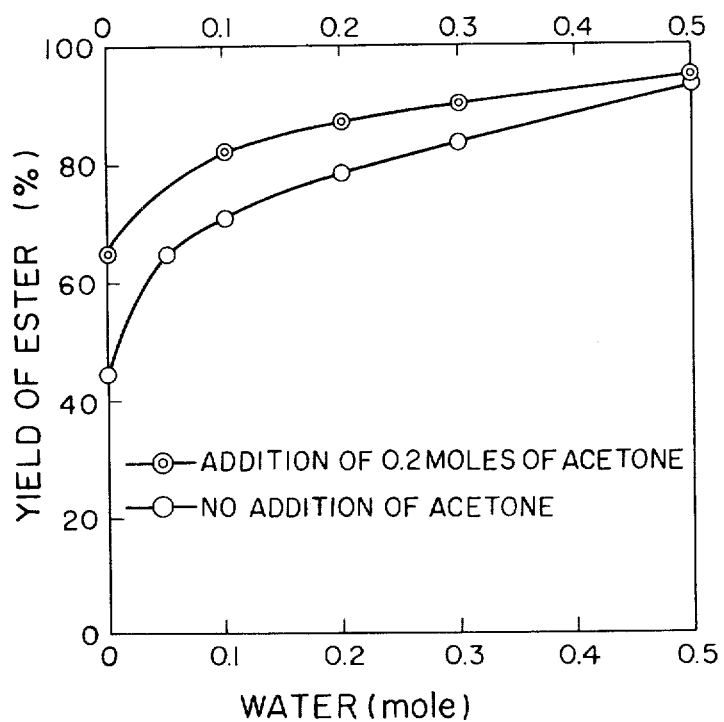

METHOD OF PREPARING ESTERS OF CARBOXYLIC ACIDS

BACKGROUND OF THE INVENTION

The art of manufacturing esters of carboxylic acids by reacting olefins, alcohols and carbon monoxide with one another in the presence of an appropriate cobalt compound is well known. This reaction is effected by the catalytic action of dicobalt octacarbonyl or cobalt carbonyl hydride being formed from a cobalt compound under appropriate reaction conditions. The method of preparing esters of carboxylic acids utilizing this reaction involves the following two problems. The first one is that it requires separation of the catalyst from the reactant mixture prior to recovering the esters of carboxylic acids by distilling means. In other words, said catalyst present in the reaction product is possessed of high vapor pressure so that direct distillation of the reaction product would distill said catalyst together with esters of carboxylic acids, resulting in coloring of the esters of carboxylic acids. Therefore, it is well known conventionally to adopt the process of adding water (or steam), hydrogen or mineral acids to the reaction product and effecting decomposition of said catalyst by heating subsequently thereto. This process is, however, defective in that it necessitates complicated regeneration processes when reuse of the catalyst is intended.

The other problem is that the rate of the reaction is slow. In other words, the reaction of olefins with carbon monoxide and alcohols may be regarded as being a reaction effected by substituting alcohol for hydrogen in the oxo synthesis. However, direct application of the same reaction conditions as in the oxo synthesis would reduce the rate of reaction and result in a yield of 40% or thereabout of esters of carboxylic acids at the most. Such being the case, in this field of industry, there have hitherto been proposed various improvements with a view to efficient effectuation of said reaction. Japanese Patent Publication No. 1285/1966 has proposed a method of increasing the rate of reaction and enhancing the yield of esters of carboxylic acids by making hydrogen coexist with propylene employed as olefin. According to this method, however, coexistence of hydrogen in the reaction zone leads to a concurrent oxo reaction, generating as much as 17% of aldehydes as by-products relative to esters of carboxylic acids. With a view to controlling this oxo reaction, there has been proposed a process of adding pyridine as a promoter to the reaction zone, and yet, generation of aldehydes as by-product is about 3.5% relative to esters of carboxylic acids. Belgian Patent Specification No. 743,243 discloses a method employing olefins having more carbon atoms as the starting material. But, even in the case of this method, generation of the by-product aldehydes is in the range of from 1 to 5% relative to esters of carboxylic acids.

As seen in the foregoing, in the reaction of olefin with carbon monoxide and alcohol, enhancement of the yield of esters of carboxylic acids tends to increase generation of the by-product aldehydes, and any of those methods hitherto developed as the means of limiting generation of the by-product aldehydes has not necessarily brought about a satisfactory result. In this connection, the by-product aldehyde, which not only causes undesirable coloring or offensive smell of the desired esters of carboxylic acids but also deteriorates said esters of carboxylic acids per se, has a boiling point which approximates that of the esters of carboxylic acids so that it is generally impossible to separate it from the ester of carboxylic acid by a simple distilling means. From this point of view, the problem of minimizing the quantity of the by-product aldehyde is a matter of great concern in this field of industry.

SUMMARY OF THE INVENTION

The object of the present invention is to provide a method of preparing esters of carboxylic acids, which makes it possible not only to obtain esters of carboxylic acids at high yield by minimizing generation of the by-product aldehydes but also to recover the used catalyst easily in a reusable state as will be described later on. To be precise, the present invention relates to a method of preparing esters of carboxylic acids by reaction of olefins with carbon monoxide and alcohol in the presence of a cobalt compound catalyst, which comprises the step of adding 0.1 mole or more of water per 1 mole of the material olefin at the time of starting the reaction.

According to the method of the present invention, unsaturated hydrocarbons having at least one carbon-carbon double bond and about 6 to 18 carbon atoms are applicable as the starting olefin material. For example, mono-olefins such as 1-hexene, 2-hexene, 1-heptene, 2-heptene, 1-octene, 2-octene, 3-octene, 1-nonene, 1-decene, 1-undecene, 1-dodecene, 1-tridecene, 1-tetradecene, 1-pentadecene, 1-hexadecene, 1-heptadecene and 1-octadecene; diolefins such as hexadienes, heptadienes and octadienes; and cycloolefins such as cyclooctene, 1,5-cyclooctadiene and 1,7-cyclooctadiene are applicable. Among these substances, α-mono-olefin is particularly suitable. Olefin mixtures such as those consisting of $C_3$-olefin, $C_8$-olefins and $C_{10}$-olefins and those consisting of $C_{10}$-olefins, $C_{12}$-olefins and $C_{14}$-olefins are also applicable.

As the alcohol for use in the present invention, methanol, ethanol, isopropanol, etc. are applicable, but when an alcohol having 3 or more carbon atoms is employed, the speed of the reaction tends to become low. The quantity of alcohol to be employed in the present invention can be optionally chosen, but it is desirable to be in the range of from 0.5 to 4 moles, preferably from 1.0 to 2.0 moles, per 1 mole of olefin.

Carbon monoxide for use in the present invention can be applied either independently or in mixture with hydrogen. However, in the case of mixing with hydrogen, the hydrogen content is up to 4.5% by volume, preferably less than 1% by volume. The appropriate pressure of the carbon monoxide (i.e., the total pressure after mixing with hydrogen) is 60 Kg/cm² or more, preferably 90 Kg/cm²; any increase of said pressure above 250 Kg/cm² would be fruitless.

As catalyst for use in the present invention, cobalt compounds capable of forming dicobalt octacarbonyl or cobalt carbonyl hydride under appropriate reaction conditions are employed in accordance with the conventional method. As the substances illustrative of said cobalt compounds, there are cobalt oxide, cobalt hydroxide, cobalt salt of 2-ethyl hexanoic acid and analogues thereof. These cobalt compounds are usually employed in amounts ranging from 0.001 to 0.1 mole %, preferably from 0.005 to 0.05 mole %, per 1 mole of olefin. Besides, addition of pyridine and its derivatives such as β-picoline, γ-picoline, 3,5-lutidine and N-methyl pyrrolidone as a promoter to the extent of about 1 to 50 moles, preferably from about 2 to 20 moles per 1 moles, of said cobalt compounds catalyst is desirable for the purpose of checking generation of the by-product aldehydes and increasing the yield of esters of carboxylic acids particularly when hydrogen and carbon monoxide are used jointly.

The reaction temperature is 90°C or higher. However, application of a temperature higher than 200°C would cause decomposition of cobalt carbonyl, so that the reaction temperature is generally held within the range of from 90° to 200°C.

The method for the present invention is characterized by the step of adding water to the reaction zone at the time of effecting the reaction of olefin with alcohol and carbon monoxide in the presence of a cobalt catalyst as set forth above. The quantity of water for use in the present method is required to be 0.1 mole or more per 1 mole of olefin, but addition of too much water (such as 2 moles or more per 1 mole of olefin) is inadvisable as it would reduce the rate of reaction, increase of the by-product carboxylic acids and so forth. Meanwhile, for the purpose of smooth recovery of catalysts, the quantity of water to be added is desirable to be 0.2 mole or more. Consequently, the optimum quantity of water to be added is in the range of from 0.2 to 1.5 moles per 1 mole of olefin.

In the present method, a further excellent effect can be brought about by adding ketone, with the water, to the starting olefin material to the extent of 0.1 to 2 moles, preferably 0.5 to 2 moles, per 1 mole of said olefin. As ketones suitable for this purpose, aliphatic or alicyclic ketones having up to 11 carbon atoms are applicable. To enumerate applicable ketones, there are acetone, methyl ethyl ketone, methyl isobutyl ketone, diethyl ketone, diisobutyl ketone and cyclohexyl ethyl ketone as well as their analogues.

The effect achieved by the present invention is as illustrated by the appended drawing. The drawing is a graph showing the effect that adding water, or water plus ketone, has on the yield of esters of carboxylic acids.

The drawing shows the results of a series of tests conducted respectively by putting 0.5 mole of 1-decene, 2.0 moles of methanol, 0.06 mole of pyridine and 0.008 mole of cobalt octanoate in a 300 ml autoclave, adding a prescribed quantity of water and then effecting reaction for 5 hours under carbon monoxide of 150 Kg/cm$^2$ pressure at a temperature of 160°C. The results are expressed in terms of the relation between the yield of esters of carboxylic acids and the quantity of water added. As is clear from this showing, addition of water increases the yield of esters of carboxylic acids. The present invention also has the effect of drastically decreasing the quantity of the by-product aldehydes. In this connection, when carbon monoxide containing 10% by volume of hydrogen is employed, reactions effected without adding water to the reaction system gives rise to as much as 1 to 5% of by-product aldehydes relative to the esters of carboxylic acids, whereas addition of a small quantity of water can limit generation of the by-product aldehydes to be 1% at most, generally less than 0.3%, and, under ideal conditions, it is possible to limit generation of the by-product aldehydes so that only traces thereof are present in the reaction product. Further, it is to be noted that, when cobalt salts of organic acids are employed as the cobalt compounds catalyst, there is admittedly produced some water as by-product, but the quantity of that is not sufficient to achieve effects equal to that of the present invention.

The present invention has also the effect of facilitating recovery of the catalyst. To discuss this point further, according to the conventional methods, the cobalt compounds catalyst are present in the form of cobalt carbonyl hydride or dicobalt octacarbonyl (hereinafter generically named 'cobalt carbonyl') as dissolved in the reaction mixture, and inasmuch as the vapor pressure of this cobalt carbonyl is high, when the reaction mixture is subjected to direct distillation, the desired esters of carboxylic acids become stained and colored with said cobalt carbonyl. Therefore, the conventional methods require the process of adding water (or steam), hydrogen, mineral acids and so on to the reaction product before distillation in order to decompose the cobalt carbonyl by heating, and further require complicated catalyst regeneration processes when reuse of catalyst is intended.

On the other hand, according to the present invention, carboxylic acids can be stably retained within the reaction mixture, and therefore, when the reaction mixture is subjected to distillation, cobalt carbonyl can be easily converted to cobalt salts of carboxylic acids at an early stage of the distillation. Accordingly, the distillate is absolutely free from mixing with cobalt carbonyl, and it is always obtained in a colorless, transparent state. Moreover, cobalt salts of carboxylic acids formed at an early stage of distillation are thermally stable as compared with cobalt carbonyl, so that they never pollute the wall of the still column, but remain in the form of cobalt salts of carboxylic acids within the distillation residue. Therefore, cobalt salts of carboxylic acids contained in the distillation residue can be employed as catalyst for reaction either intact or upon separation from said residue.

Further, when a small quantity of air or oxygen is blown into the reaction mixture before distillation, cobalt carbonyl present in the reaction mixture can be converted to cobalt salts of carboxylic acids at that point in time.

Hereunder will be further elucidated the method of the present invention and the effect to be brought about thereby with reference to examples embodying the present method together with some comparative experiments. It will be understood that the esters of carboxylic acids obtained by the method of the present invention are suitable for the same uses as those for derivatives from natural oils and fats, like in the case of general synthetic esters of carboxylic acids. For instance, they can be utilized as an intermediate for fatty acid alkylolamides, sugar esters of fatty acids, etc. or material for various synthetic resin plasticizer, lubricating oil, cosmetics, etc.

DESCRIPTION OF THE PREFERRED EMBODIMENTS

Comparative Experiment 1.

0.5 mole of 1-decene, 2.0 moles of methanol, 0.06 mole of pyridine and 0.008 mole of cobalt octanoate were charged in a 300 ml.-autoclave made of stainless steel, and reaction was continued for 5 hours under a carbon monoxide pressure of 150 Kg/cm$^2$ at a temperature of 160°C. When the reaction mixture was directly subjected to distillation, the whole distillate was stained yellow with cobalt compound. The yield of the distilled methyl undecanoates stained yellow with cobalt compounds was 44% relative to the material 1-decene. The aldehyde content of this distillates was 2.7% relative to ester as a result of analysis by means of gas chromatograph. Cobalt compounds could be recovered in the form of cobalt undecanoate at the yield of 37% by reprecipitation method from the distillation residue. However, there was observed adhesion of black metal cobalt and other substances arising from decomposition of cobalt carbonyls on the wall of still column, and this metal cobalt was unremovable unless washed with an acid having a high oxidizability such as nitric acid.

Comparative Experiment 2.

The process of Comparative Experiment 1 was repeated, except for substituting carbon monoxide containing 10% by volume of hydrogen for the carbon monoxide. As a result, the yields of the distilled methyl undecanoates stained yellow were 61%, and the aldehyde contents of this distillate were 7.4%. Cobalt could be recovered in the form of cobalt undecanoate in the yield of 41%, but there was observed adhesion of black metal cobalt and the like on the wall of still column.

Comparative Experiment 3.

The process of Comparative Experiment 2 was repeated except for substituting γ-picoline for pyridine. As a result, the yield of the distilled methyl undecanoate stained yellow was 78%, and the aldehyde content of this distillate was 3.1%. Cobalt could be recovered in the form of cobalt undecanoate at the yield of 49%, but the wall of still column got polluted with black metal cobalt and so on.

Comparative Experiment 4.

The process of Comparative Experiment 3 was repeated except for substituting carbon monoxide containing 4.5% by volume of hydrogen for carbon monoxide containing 10% by volume of hydrogen. As a result, yellow-colored methyl undecanoates were distilled at the yield of 76%. The aldehyde content of this distillate was 2.0%.

Comparative Experiment 5.

The process of Comparative Experiment 3 was repeated 5 times except that the distillation residue obtained in Comparative Experiment 3 was utilized as catalyst for the first reaction, the distillation residue arising from said first reaction was utilized as catalyst for the second reaction, and so on. As a result, the yield of methyl undecanoate from the fifth reaction was no more than 21%.

EXAMPLE 1

The process of Comparative Experiment 3 was repeated except for adding 0.2 mole of water per 1 mole of 1-decene into the reaction zone. As a result, methyl undecanoates was distilled in the form of a colorless, transparent liquid, and their yield was 80%. The aldehyde content of this distillate was 2.8%. Cobalt could be recovered in the form of cobalt undecanoate at the yield of 87%. No adhesion of substances arising from decomposition of cobalt carbonyl, such as metal cobalt, was observed on the wall of still column.

EXAMPLE 2

The process of Comparative Experiment 1 was repeated except for adding water as 1.0 mole of water per 1 mole of 1-decene be present in the reaction zone. As a result, the distillate obtained was completely colorless and transparent. Methyl undecanoates were obtained at the yield of 93% relative to the material olefins. The aldehydes content of this distillate was 0.3%. Cobalt could be recovered in the form of cobalt undecanoates at the yield of 91%. Besides, the wall of still column was free of adhesion of any substance arising from decomposition of cobalt carbonyl.

EXAMPLE 3

The process of Example 2 was repeated except for modifying the quantity of water to be present in the reaction zone to be 0.2 mole per 1 mole of 1-decene. As a result, colorless, transparent methyl undecanoates were distilled at the yield of 71%. The aldehydes content of this distillate was 0.3%. Cobalt could be recovered in the form of cobalt undecanoates at the yield of 89%. Besides, the wall of still column was free of adhesion of metal cobalt and the like.

EXAMPLE 4

The process of Example 2 was repeated except for modifying the quantity of water to be present in the reaction zone to be 0.1 mole per 1 mole of 1-decene. As a result, colorless, transparent methyl undecanoates were distilled at the yield of 65%. The aldehydes content of this distillate was 0.4%. Cobalt could be recovered in the form of cobalt undecanoates at the yield of 50%. Besides, the wall of still column was free of adhesion of metal cobalt and the like.

EXAMPLE 5

The process of Example 3 was repeated except for substituting γ-picoline for pyridine. As a result, colorless, transparent methyl undecanoates were distilled at the yield of 87%. The aldehydes content of this distillate was less than 0.1%. The distillation residue contained bluish-violet cobalt undecanoate as dissolved therein. The wall of still column was free of adhesion of metal cobalt and the like.

EXAMPLE 6

The process of Example 5 was repeated except for substituting carbon monoxide containing 0.8% by volume of hydrogen for the carbon monoxide employed for Example 5. As a result, a colorless, transparent methyl undecanoates were distilled at the yield of 85%. The aldehydes content of this distillate was 0.5%.

EXAMPLE 7

The process of Comparative Experiment 4 was repeated except for adding water as 0.2 mole of water per 1 mole of olefin be present in the reaction zone. As a result, a colorless, transparent methyl undecanoates were distilled at the yield of 80%. The aldehydes content of this distillate was 1.0%.

EXAMPLE 8

The process of Example 5 was repeated except for modifying the reaction temperature to be 150°C. As a result, colorless, transparent methyl undecanoates were distilled at the yield of 78%. No aldehydes was detected in this distillate.

EXAMPLE 9

The process of Example 3 was repeated except for employing 1.0 mole of methanol instead of 2.0 moles of methanol. As a result, colorless, transparent methyl undecanoates were distilled at the yield of 76%. The aldehydes content of this distillate was 0.3%.

EXAMPLE 10

The process of Example 3 was repeated except for employing 3.0 moles of methanol instead of 2.0 moles of methanol. As a result, colorless, transparent methyl undecanoates were distilled at the yield of 67%. The aldehydes content of this distillate was 0.5%.

EXAMPLE 11

The process of Example 5 was repeated except for employing 2.0 moles of ethanol instead of 2.0 moles of methanol and modifying the quantity of γ-picoline from 0.06 mole to 0.18 mole. As a result, colorless, transparent ethyl undecanoates were distilled at the yield of 80%. The aldehydes content of this distillate was 0.1%.

EXAMPLE 12

The process of Example 11 was repeated except for modifying the quantity of γ-picoline from 0.18 mole to 0.025 mole. As a result, colorless, transparent ethyl undecanoates were distilled at the yield of 76%. The aldehydes content of this distillate was 0.2%.

EXAMPLE 13

The process of Example 2 was repeated except for substituting 1-octadecene for 1-decene and modifying the reaction temperature to be 170°C. As a result, colorless, transparent methyl nonadecanoates were distilled at the yield of 85%. The aldehydes content of this distillate was 0.3%.

EXAMPLE 14.

0.5 mole of 1-octene, 2.0 moles of methanol, 0.024 mole of dicobalt octacarbonyl and 0.18 mole of γ-picoline were made to react on one another within a reaction zone under carbon monoxide pressure of 200 Kg/cm$^2$ in the presence of 0.2 mole of water per 1 mole of 1-octene at 140°C for 5 hours. As a result, colorless, transparent methyl nonanoates were obtained at the yield of 95%. No aldehyde was detected in this methyl nonanoate.

EXAMPLE 15

The process of Example 5 was repeated except for employing 0.008 mole of cobalt undecanoate recovered from the distillation residue of Example 5 in lieu of cobalt octanoate. As a result, colorless, transparent methyl undecanoates were obtained at the yield of 91%. The aldehydes content of this distillate was less than 0.1%.

EXAMPLE 16

Reaction was effected in the same way as in Example 5 except for employing the distillation residue of Example 5 in lieu of 0.008 mole of cobalt octanoate. Then, by utilizing the distillation residue resulting from this reaction as catalyst, similar reaction was repeated 10 times. When the reaction product was subjected to distillation, colorless, transparent methyl undecanoates were obtained at the yield of 85%. The aldehydes content of this distillate was less than 0.1%.

EXAMPLE 17

The process of Comparative Experiment 1 was repeated except for reducing the quantity of methanol to 1.0 mole while adding 0.55 mole of acetone and 0.5 mole of water. As result, a colorless, transparent methyl undecanoates were obtained at the yield of 95%. The aldehydes content of this distillate was 0.2%. Cobalt compound could be recovered in the form of cobalt undecanoates at the yield of 93%.

EXAMPLE 18

The process of Example 17 was repeated except for utilizing the distillation residue of Example 17 as cobalt compound catalyst. As a result, colorless, transparent methyl undecanoate were obtained at the yield of 93%. The by-product aldehydes content of this distillate was 0.3%.

EXAMPLE 19

The process of Comparative Experiment 1 was repeated except for adding 0.1 mole of water and 0.1 mole of acetone. As a result, colorless, transparent methyl undecanoates were obtained at the yield of 77%. The by-product aldehydes content of this distillate was 0.4%. Cobalt compound could be recovered in the form of cobalt undecanoates at the yield of 90%.

EXAMPLE 20

The process of Comparative Experiment 1 was repeated except for adding 0.4 mole of water and 0.1 mole of acetone. As a result, colorless, transparent methyl undecanoates were obtained at the yield of 90%. The by-product aldehydes content of this distillate was 0.4%. And, cobalt compound could be recovered in the form of cobalt undecanoates at the yield of 93%.

EXAMPLE 21

The process of Example 17 was repeated except for omitting 0.06 mole of pyridine. As a result, colorless, transparent methyl undecanoates were obtained at the yield of 74%. The by-product aldehydes content of this distillate was 0.8%. And, cobalt compound could be recovered in the form of cobalt undecanoates at the yield of 87%.

EXAMPLE 22

The process of Example 17 was repeated except for employing 0.3 mole of cyclohexanone in lieu of 0.55 mole of acetone. As a result, colorless, transparent methyl undecanoates were obtained at the yield of 90%. The by-product aldehydes content of this distillate was 0.4%. And, cobalt compound could be recovered in the form of cobalt undecanoates at the yield of 85%.

EXAMPLE 23

The process of Example 3 was repeated except for employing 0.6 mole of methanol instead of 2.0 moles of methanol. As a result, colorless, transparent methyl undecanoates were obtained at the yield of 90%. The by-product aldehydes content of this distillate was 0.3%.

What is claimed is:

1. In a process for preparing esters of carboxylic acid, which comprises, in a reaction system, reacting olefin, alcohol and carbon monoxide gas containing up to 4.5 percent by volume of hydrogen, at a temperature of from 90° to 200°C and at a pressure of at least 60 kg/cm$^2$, in the presence of cobalt carbonyl catalyst, the improvement which comprises: adding to the reaction system at the start of the reaction from 0.2 to 1.5 moles of water, per mole of olefin in the reaction system, whereby to increase the yield of esters of carboxylic acids and to minimize the amount of aldehyde by-products formed by the reaction.

2. A process according to claim 1, including the further improvement which comprises: adding to the reaction system at the start of the reaction from 0.1 to 2 moles of a saturated aliphatic or alicyclic ketone having up to 11 carbon atoms, per mole of olefin in the reaction system, whereby to increase further the yield of esters of carboxylic acids.

3. A process according to claim 1, wherein said olefin is a mono-olefin having from 6 to 18 carbon atoms and said alcohol is an alkanol having up to 3 carbon atoms.

4. A process according to claim 1, wherein the amount of alcohol present at the start of reaction is in the range of from 1.0 to 2.0 moles, per mole of olefin.

5. A process according to claim 1, wherein the carbon monoxide gas supplied to the reaction system is free of hydrogen.

6. A process according to claim 1, wherein the carbon monoxide gas supplied to the reaction system contains up to 1 percent by volume of hydrogen.

* * * * *